(12) United States Patent
Kinney et al.

(10) Patent No.: US 12,029,146 B2
(45) Date of Patent: Jul. 9, 2024

(54) IMPLEMENT HAVING WEIGHT TRANSFER SYSTEM AND METHOD OF OPERATING THE SAME

(71) Applicant: Deere & Company, Moline, IL (US)

(72) Inventors: Colter W. Kinney, Lohrville, IA (US);
Grant J. Wonderlich, Milan, IL (US);
Michael C. Steele, Orion, IL (US)

(73) Assignee: Deere & Company, Moline, IL (US)

( * ) Notice: Subject to any disclaimer, the term of this patent is extended or adjusted under 35 U.S.C. 154(b) by 695 days.

(21) Appl. No.: 16/918,152

(22) Filed: Jul. 1, 2020

(65) Prior Publication Data

US 2021/0127549 A1   May 6, 2021

Related U.S. Application Data

(60) Provisional application No. 62/928,111, filed on Oct. 30, 2019.

(51) Int. Cl.
*A01B 63/32*   (2006.01)
*A01C 7/20*   (2006.01)

(52) U.S. Cl.
CPC .............. *A01B 63/32* (2013.01); *A01C 7/203* (2013.01); *A01C 7/205* (2013.01)

(58) Field of Classification Search
CPC ... A01B 63/11; A01B 63/1145; A01B 63/145; A01B 63/32; A01B 73/044; A01C 7/203; A01C 7/205
See application file for complete search history.

(56) References Cited

U.S. PATENT DOCUMENTS

| 2,192,948 A | 3/1940 | White |
| 4,413,685 A | 11/1983 | Gremelspacher et al. |

(Continued)

FOREIGN PATENT DOCUMENTS

| EP | 0171719 A2 | 2/1986 |
| EP | 2322026 A1 | 5/2011 |

(Continued)

OTHER PUBLICATIONS

Vance J. Vandoren, "Exploring the Basic Concepts of Multivariable Control," Feb. 7, 2017, Control Engineering (controleng.com) (Year: 2017).*

(Continued)

*Primary Examiner* — Alicia Torres
(74) *Attorney, Agent, or Firm* — Michael Best & Friedrich LLP

(57) ABSTRACT

An implement includes a frame having a main section and a wing section pivotally coupled to the main section. A row unit is mounted to the frame wing section to dispense a product to the ground surface. A weight transfer system transfers weight from the frame main section to the frame wing section to reduce the load carried by the main wheel assembly. A row unit downforce system applies a force on the row unit relative to the frame wing section. A pressure transducer measures the force applied by the row unit downforce system and generates a signal indicative of the applied force. A control system operates the weight transfer system in response to the signal from the pressure transducer to assist the row unit downforce system. The control system actuates the weight transfer system to apply an additional force on the frame wing section in response to the signal.

20 Claims, 5 Drawing Sheets

(56) References Cited

U.S. PATENT DOCUMENTS

| | | | |
|---|---|---|---|
| 4,445,923 | A | 5/1984 | Shetterly |
| 4,850,454 | A | 7/1989 | Korody |
| 4,915,014 | A | 4/1990 | Gilmore et al. |
| 5,201,372 | A | 4/1993 | Thompson et al. |
| 5,479,992 | A | 1/1996 | Bassett |
| 5,591,945 | A | 1/1997 | Kent |
| 6,076,611 | A | 6/2000 | Rozendaal |
| 6,216,794 | B1 | 4/2001 | Buchl |
| 6,530,334 | B2 | 3/2003 | Hagny |
| 6,688,244 | B1 | 2/2004 | Meyer et al. |
| 7,360,495 | B1 | 4/2008 | Martin |
| 7,673,570 | B1 | 3/2010 | Bassett |
| 8,380,356 | B1 | 2/2013 | Zielke et al. |
| 8,863,676 | B2 | 10/2014 | Brockmann et al. |
| 9,107,337 | B2 | 8/2015 | Bassett |
| 9,198,343 | B2 | 12/2015 | Mariman et al. |
| 9,232,687 | B2 | 1/2016 | Bassett |
| 9,506,750 | B2 | 11/2016 | Last |
| 9,554,504 | B2 | 1/2017 | Houck |
| 9,693,496 | B2 | 7/2017 | Tevs et al. |
| 9,750,174 | B2 | 9/2017 | Sauder et al. |
| 9,888,624 | B2 | 2/2018 | Maniar et al. |
| 9,968,030 | B2 | 5/2018 | Kowalchuk et al. |
| 10,091,926 | B2 | 10/2018 | Maro |
| 10,462,956 | B2 | 11/2019 | Hamilton |
| 10,555,454 | B2 | 2/2020 | Garner et al. |
| 10,681,859 | B2 | 6/2020 | Rhodes et al. |
| 10,687,456 | B2 | 6/2020 | Garner et al. |
| 10,687,457 | B2 | 6/2020 | Hubner et al. |
| 10,694,658 | B2 | 6/2020 | Wonderlich et al. |
| 10,918,012 | B2 | 2/2021 | Rhodes |
| 11,122,731 | B2 | 9/2021 | Hubner et al. |
| 11,134,606 | B2 | 10/2021 | Salowitz et al. |
| 11,202,404 | B2 | 12/2021 | Walter et al. |
| 11,206,754 | B2 | 12/2021 | Rhodes |
| 11,279,366 | B1 | 3/2022 | Shroll et al. |
| 2002/0174813 | A1 | 11/2002 | Hagny |
| 2005/0155536 | A1 | 7/2005 | Wendte et al. |
| 2010/0180695 | A1 | 7/2010 | Sauder et al. |
| 2011/0313575 | A1 | 12/2011 | Kowalchuk et al. |
| 2012/0048160 | A1 | 3/2012 | Adams et al. |
| 2012/0060730 | A1 | 3/2012 | Bassett |
| 2012/0186503 | A1 | 7/2012 | Sauder et al. |
| 2014/0000919 | A1 | 1/2014 | Bachman et al. |
| 2014/0026748 | A1 | 1/2014 | Stoller et al. |
| 2014/0048296 | A1 | 2/2014 | Bassett |
| 2014/0076047 | A1 | 3/2014 | Liu |
| 2014/0116735 | A1 | 5/2014 | Bassett |
| 2014/0303854 | A1 | 10/2014 | Zielke |
| 2015/0013579 | A1 | 1/2015 | Mariman et al. |
| 2015/0094917 | A1 | 4/2015 | Blomme et al. |
| 2015/0230391 | A1 | 8/2015 | Houck |
| 2015/0237790 | A1 | 8/2015 | Redden et al. |
| 2016/0101426 | A1 | 4/2016 | Heinrichs |
| 2016/0128263 | A1 | 5/2016 | Bassett |
| 2016/0128265 | A1 | 5/2016 | Bassett |
| 2016/0165789 | A1 | 6/2016 | Gervais et al. |
| 2016/0212928 | A1 | 7/2016 | Wileniec et al. |
| 2016/0249525 | A1 | 9/2016 | Baurer et al. |
| 2016/0338257 | A1* | 11/2016 | Sauder .................. A01C 7/203 |
| 2016/0348529 | A1 | 12/2016 | Emmons et al. |
| 2017/0086349 | A1 | 3/2017 | Tevs et al. |
| 2017/0086360 | A1 | 3/2017 | Gamer et al. |
| 2017/0086362 | A1 | 3/2017 | Natarjan et al. |
| 2017/0094894 | A1 | 4/2017 | Heim et al. |
| 2017/0303465 | A1 | 10/2017 | Koch et al. |
| 2017/0367251 | A1 | 12/2017 | Hamilton |
| 2018/0042171 | A1 | 2/2018 | Maro |
| 2018/0092287 | A1 | 4/2018 | Garner et al. |
| 2018/0092288 | A1 | 4/2018 | Garner et al. |
| 2018/0092289 | A1 | 4/2018 | Wonderlich et al. |
| 2018/0092290 | A1 | 4/2018 | Hubner et al. |
| 2018/0092292 | A1 | 4/2018 | Rhodes et al. |
| 2018/0092293 | A1 | 4/2018 | Rhodes |
| 2018/0114305 | A1 | 4/2018 | Strnad et al. |
| 2018/0116098 | A1 | 5/2018 | Bassett |
| 2018/0120082 | A1 | 5/2018 | Rhodes et al. |
| 2018/0153088 | A1 | 6/2018 | Sporrer et al. |
| 2019/0124824 | A1 | 5/2019 | Hubner et al. |
| 2019/0183036 | A1 | 6/2019 | Leimkuehler et al. |
| 2020/0359559 | A1* | 11/2020 | Koch .................. A01C 7/203 |
| 2022/0022366 | A1 | 1/2022 | Salowitz et al. |
| 2022/0167994 | A1 | 6/2022 | Roberts |
| 2022/0174859 | A1 | 6/2022 | Walter et al. |
| 2022/0183205 | A1 | 6/2022 | Rhodes |

FOREIGN PATENT DOCUMENTS

| | | |
|---|---|---|
| EP | 2701482 B1 | 3/2014 |
| EP | 3072763 A1 | 9/2016 |
| EP | 3150046 A1 | 4/2017 |
| EP | 3213617 A1 | 9/2017 |
| EP | 3300563 A1 | 4/2018 |
| EP | 3300567 A1 | 4/2018 |
| EP | 3300569 A1 | 4/2018 |
| WO | 2008086283 A2 | 7/2008 |
| WO | 2012149367 A1 | 11/2012 |
| WO | 2014066650 A1 | 5/2014 |
| WO | 2014066654 A1 | 5/2014 |
| WO | 2016073964 A1 | 5/2016 |
| WO | 2016182906 A1 | 11/2016 |
| WO | 2018144553 A1 | 8/2018 |

OTHER PUBLICATIONS

Extended European Search Report and Written Opinion issued in European Patent Application No. 20200171.5, dated Mar. 16, 2021, in 11 pages.

Deere & Company, "Downforce System Options," <http://salesmanual.deere.com/sales/salesmanual/en_NA/seeding/2018/feature/row_units_and_drill_opener/planters/downforce_system.html> web page available as early as Sep. 25, 2018 (4 pages).

EP17194407.7 Extended European Search Report dated Jan. 8, 2018 (9 pages).

European Patent Office Extended Search Report for Application No. 18203540.2 dated Mar. 19, 2019 (11 pages).

European Patent Office Extended Search Report for Application No. 19152876.9 dated Jul. 4, 2019 (11 pages).

Extended European Search Report and Written Opinion issued in European Patent Application No. 20169081.5, dated Oct. 1, 2020 (8 pages).

Extended European Search Report Issued in European Patent Application No. 20158440.6 dated Jul. 6, 2020 (8 pages).

Hanna et al., "Soil Loading Effects of Planter Depth-Gauge Wheels on Early Corn Growth," Agricultural and Biosystems Engineering, 2010, 26(4):551-556.

Pruitt, "Choosing an Intel RealSense Depth Camera," <https://realsense.intel.com/compare/> dated May 24, 2018 (5 pages).

United States Patent Office Action for U.S. Appl. No. 15/692,538 dated May 20, 2019 (13 pages).

Yoshida, "Can Huawei Match Apple TrueDepth?" <https://www.eetimes.com/document.asp?doc_id=1333098> dated Mar. 22, 2018 (3 pages).

* cited by examiner

IMPLEMENT HAVING WEIGHT TRANSFER SYSTEM AND METHOD OF OPERATING THE SAME

CROSS-REFERENCE TO RELATED APPLICATIONS

This application claims priority to Provisional U.S. Patent Application No. 62/928,111 filed Oct. 30, 2019, the entire contents of which are incorporated by reference.

BACKGROUND

The present disclosure relates to implements, such as agricultural implements, having a frame with multiple sections and in particular to a weight transfer system to transfer weight from one frame section to another and a row unit down force system to transfer weight to individual row units.

SUMMARY

The invention provides, in one embodiment, an implement. A frame has a main section and a wing section pivotally coupled to the main section. A main wheel assembly is coupled to the frame main section to support the frame main section for movement over a ground surface. A wing wheel assembly is coupled to the frame wing section to support the frame wing section for movement over the ground surface. A row unit is mounted to the frame wing section to dispense a product to the ground surface. A weight transfer system is coupled to the frame main and wing sections and adapted to transfer weight from the frame main section to the frame wing section to reduce the load carried by the main wheel assembly. A row unit downforce system is coupled to the frame wing section and adapted to apply a force on the row unit relative to the frame wing section. A pressure transducer is configured to measure the force applied by the row unit downforce system and generate a signal indicative of the applied force. A control system is adapted to operate the weight transfer system in response to the signal from the pressure transducer to assist the row unit downforce system. The control system is programmed to actuate the weight transfer system to apply an additional force on the frame wing section in response to the signal.

The invention provides, in another embodiment, a method of operating an implement having a frame with a main section and a wing section pivotally coupled to the main section. The main section of the frame is supported for movement over a ground surface with a main wheel. The wing section of the frame is supported for movement over the ground surface with a wing wheel. A row unit is mounted to the wing section of the frame, the row unit including a furrow opener and a gauge wheel. The depth of the furrow which is cut into the soil by the furrow opener is regulated via the gauge wheel. A product is dispensed to the furrow via the row unit. A first hydraulic cylinder is actuated to apply a first force to the row unit from the wing section of the frame. The applied force from the first hydraulic cylinder is measured via a sensor. The applied force is compared to a reaction force at the gauge wheel via a control system. A second hydraulic cylinder is actuated to apply a second force to the wing section relative to the main section based on the comparison of the applied force and the reaction force.

The invention provides, in yet another embodiment, an implement. A frame has a main section and a wing section pivotally coupled to the main section. A main wheel assembly is coupled to the frame main section to support the frame main section for movement over a ground surface. A wing wheel assembly is coupled to the frame wing section to support the frame wing section for movement over the ground surface. A row unit is mounted to the frame wing section to dispense a product to the ground surface. A product storage system is mounted to the frame main section to carry the product. A weight transfer system is coupled to the frame main and wing sections and adapted to transfer weight from the frame main section to the frame wing section to reduce the load carried by the main wheel assembly. A row unit downforce system is coupled to the frame wing section and adapted to apply a force on the row unit relative to the frame wing section. A pressure transducer is configured to measure the force applied by the row unit downforce system and generate a signal indicative of the applied force. A control system is adapted to operate the weight transfer system in a first mode and a second mode. The control system is operable in the first mode to reduce the weight transferred from the frame main section to the frame wing section via the weight transfer system in response to a decrease in a quantity of quantity of product in the product storage system. The control system is operable in the second mode to increase the weight transferred from the frame main section to the frame wing section via the weight transfer system in response to the signal from the pressure transducer.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
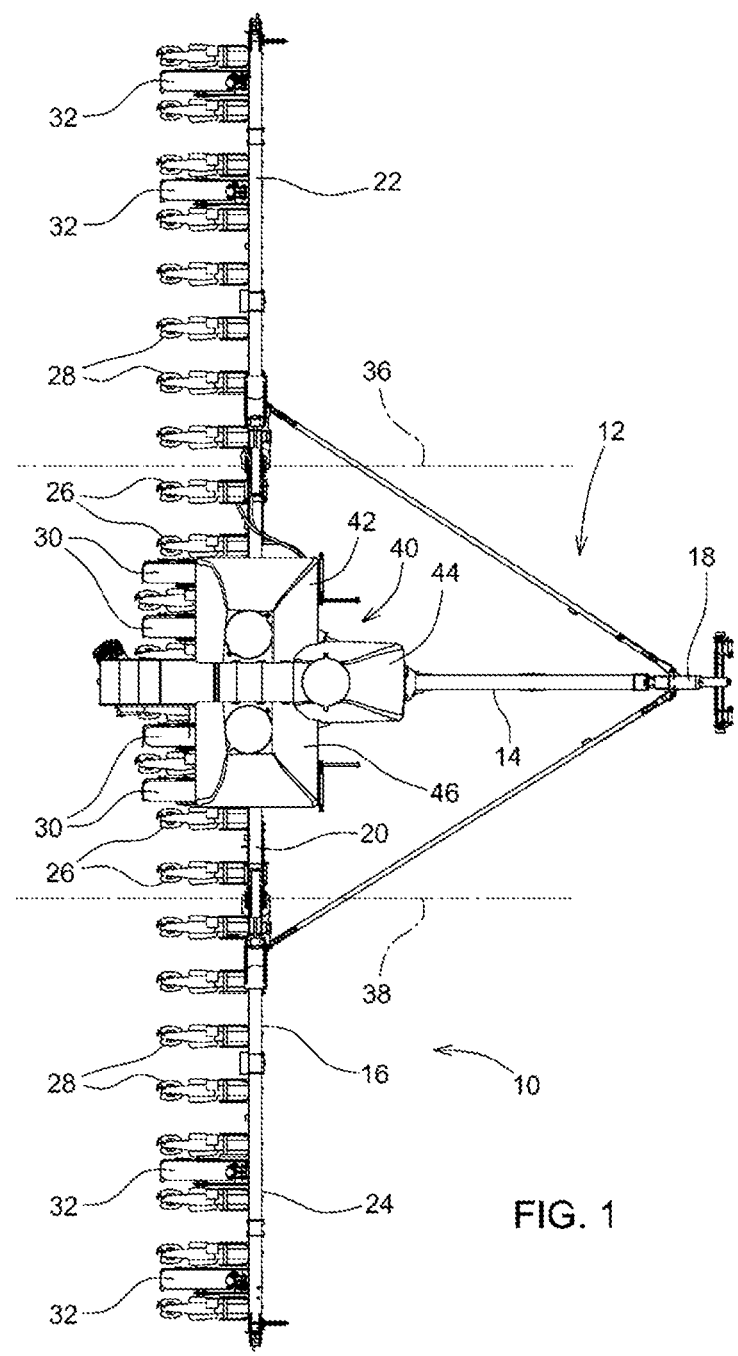
FIG. 1 is a plan view of an agricultural implement, namely a row crop planter.

An implement 10 is shown in FIG. 1 as a row crop planter. Implement 10 has a frame 12 which includes a draw bar 14 and a tool bar 16. At the forward end of the draw bar is a tongue 18 for coupling the frame 12 to a towing vehicle such as a tractor (not shown). The tool bar has a main frame section 20 and left and right frame wing sections 22 and 24 extending laterally from the frame main section. The frame wing sections are pivotally coupled to the frame main section for rotation about fore and aft extending axes 36 and 38. The pivotal connection allows the wing sections to follow the ground contour as the machine moves through a field. Row units 26 are carried by the main frame section 20 and serve as main section ground engaging tools. Row units 28 are carried by the frame wing sections and form wing ground engaging tools. Generally speaking, the row units 26 and 28 are all identical but need not be identical. The row units will be described in more detail below.

A product storage system 40 is mounted to the frame main section and includes product bins or tanks, 42, 44 and 46. The bins hold seed that is delivered pneumatically to mini-hoppers on the row units. In other embodiments (not shown), the bins may hold dry or liquid fertilizer or water that used to dilute a concentrated insecticide or other chemical to be applied.

Figure 2:
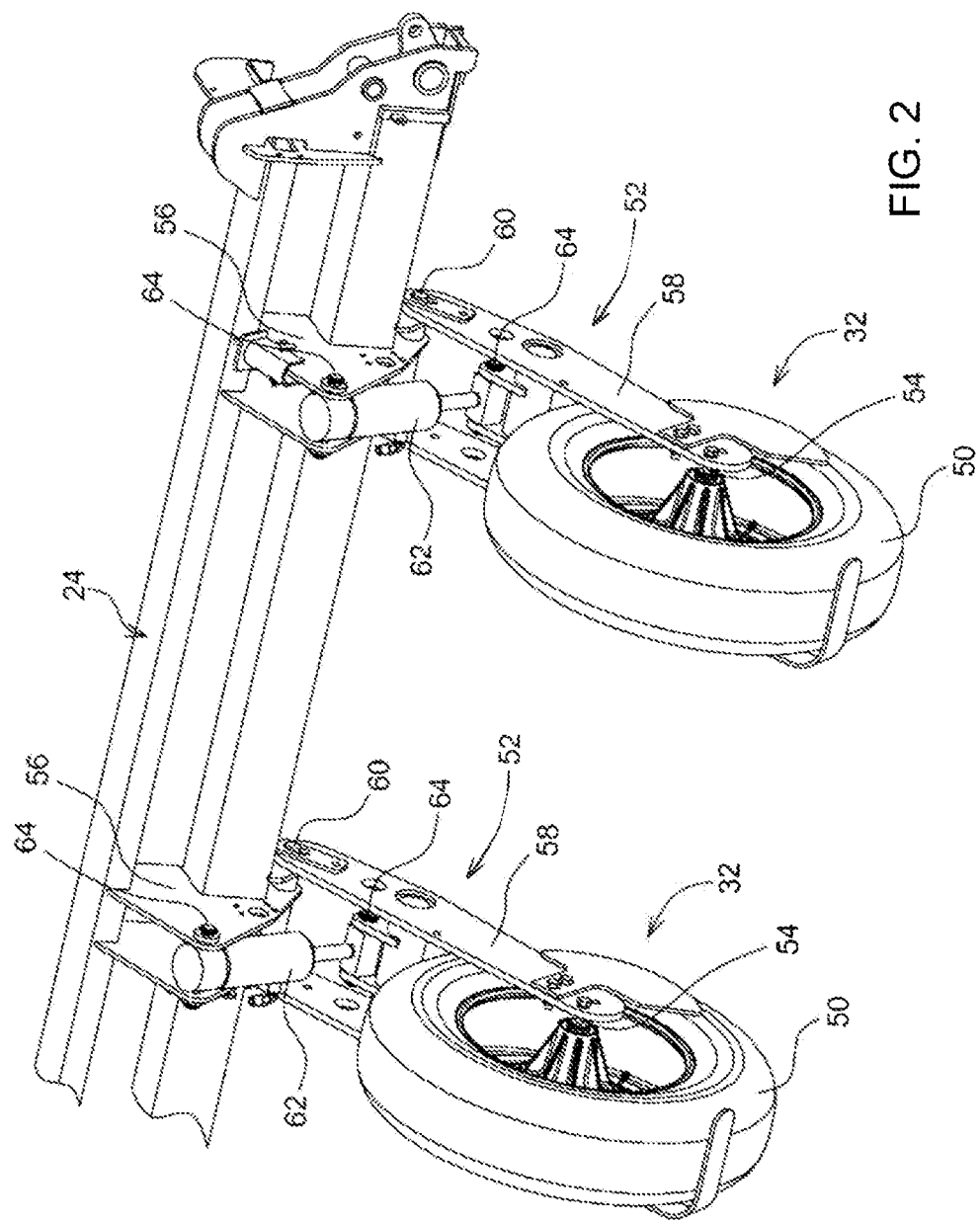
FIG. 2 is a perspective view of a wheel assembly of the implement of FIG. 1.

Main wheel assemblies 30 are coupled to the frame main section to support the frame main section for movement over a ground surface. Wing wheel assemblies 32 are coupled to the frame wing sections for supporting the frame wing sections for movement over a ground surface. Two wing wheel assemblies 32 are shown in FIG. 2. Each wing wheel assembly 32 includes a tire and wheel 50 mounted to a support structure 52 for rotation on an axle 54. The support structure 52 includes a mounting bracket 56 secured to the frame wing section 24 and a lift arm 58. The lift arm 58 is pivotally connected to the bracket 56 by a pin 60. The frame wing section 24 can be raised or lowered by operation of hydraulic cylinders 62 coupled between the lift arms 58 and mounting brackets 56 which are in turn secured to the frame wing section 24. Both the rod end and the base end of each cylinder 62 are attached to the lift arms 58 and brackets 56 by pins 64. The main wheel assemblies 30 have similar components as the wing wheel assemblies 32, namely wheels and tires, lift arms and hydraulic cylinders. The main wheel assemblies will typically have components sized to carry larger loads than the wing wheel assemblies.

Figure 3:
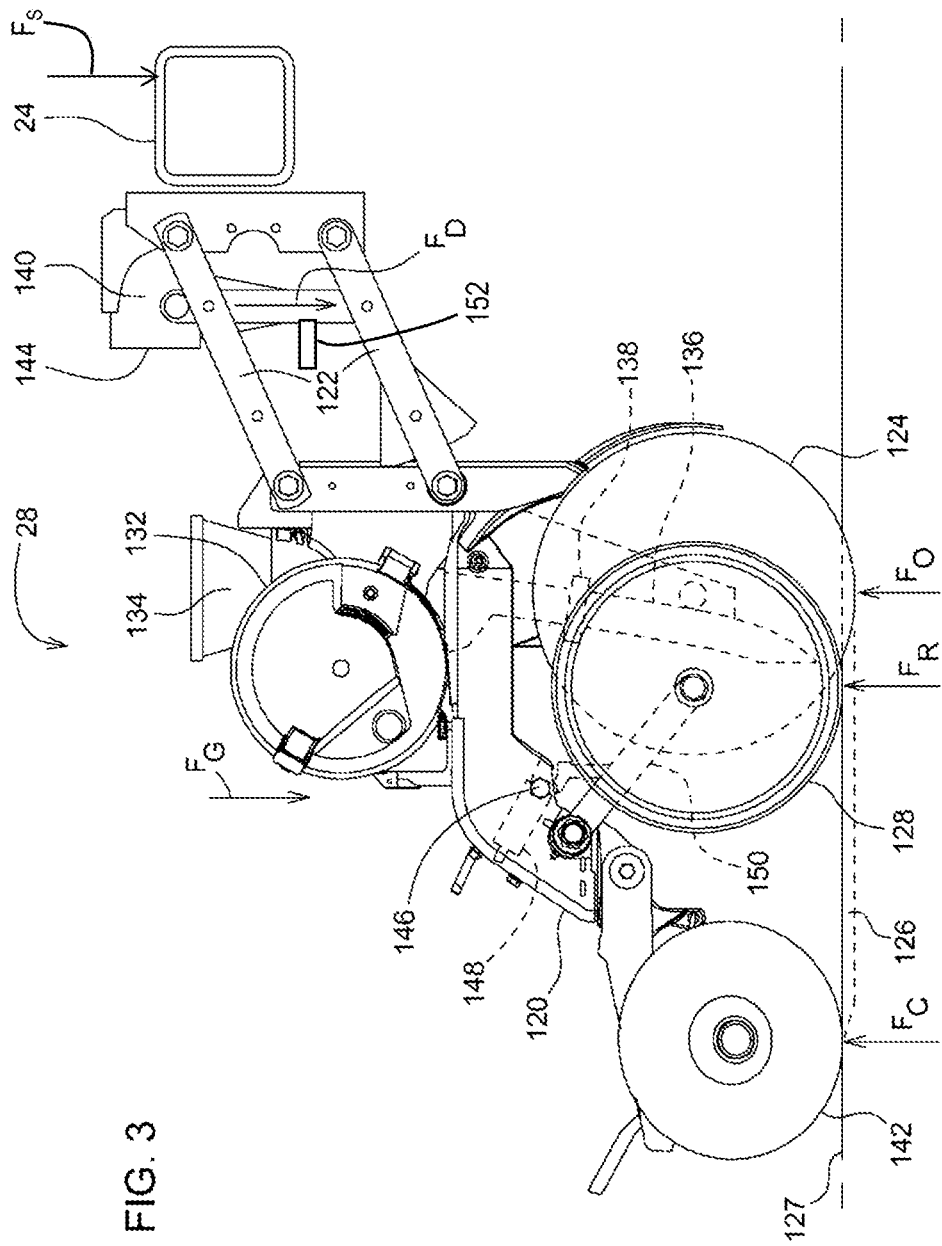
FIG. 3 is a side elevational view of a ground engaging tool of the implement of FIG. 1.

With reference to FIG. 3, a row unit 28 is shown in greater detail. Row unit 28 includes a row unit frame 120 which is attached to the frame wing section 24 by parallel linkage 122. Linkage 122 permits up and down movement of the row unit relative to the tool bar or frame wing section 24 to follow ground contours. Row unit frame 120 carries a double disc furrow opener 124 for forming a seed furrow 126 in soil or ground 127. Gauge wheels 128 are provided on the sides of the two opener discs. The gauge wheels 128 function as furrow depth regulation members. Each gauge wheel 128 is respectively associated with one disc of double disc furrow opener 124. More particularly, each gauge wheel 128 is positioned slightly behind and immediately adjacent to the outside of each respective disc of double disc furrow opener 124. (The gauge wheels 128 can be placed in other locations relative to the opener discs if desired). The gauge wheels 128 are vertically adjustable relative to the opener discs to vary the depth of the furrow 126 which is cut into the soil by the double disc furrow opener 124. Adjustment link 148, pivotally mounted to the frame at pivot pin 146 locks into place and bears against the top of pivot arms 150 carrying the gauge wheels. The adjustment link 148 thus limits upward movement of the gauge wheels relative to the opener discs.

A seed meter 132 is also carried by row unit frame 120. Seed meter 132 receives seed from a mini seed hopper 134. Seed is delivered to the mini-hoppers from the product storage system 40 by a commonly known pneumatic distribution system, an example of which is shown in U.S. Pat. No. 6,688,244 and incorporated herein by reference. The seed meter drive is not shown; numerous types of drive mechanisms are well known. Seed meter 132 delivers seeds sequentially to a seed tube 136 through which the seed falls by gravity to the furrow 126. The seed meter 132 and seed tube 136 form a product dispenser to dispense product to the furrow 126. A seed sensor 138 on the seed tube 136 detects passing seed as part of a monitoring system. The seed sensor 138 and monitor 230 can detect the product being dispensed. By combining the detected product dispensed with machine travel speed or position and time data, a product dispense rate is determined.

A pair of closing wheels 142 follows behind the gauge wheels and are positioned generally in line with double disc furrow opener 124. Closing wheels 142 push soil back into the furrow 126 upon the seed or product deposited therein. Numerous types and styles of closing wheels or devices are known.

A supplemental down force system includes a row unit down force actuator 140 in the form of an adjustable pneumatic down force cylinder 144 on each row unit 28. The cylinder 144 acts between the tool bar 16 and the linkage 122 to apply supplemental down force on the row unit and the row unit components engaging the soil. The supplemental down force applied by the cylinder 144 ensures that there is sufficient force to fully insert the double disc furrow opener 124 into the soil, forming the furrow 126 to the desired depth. The supplemental down force applied to the row unit by the cylinder is shown by the arrow FD. While only a down force cylinder 144 is shown in FIG. 3, there may also be an up force, or lift cylinder. In other systems, there may be an adjustable mechanical spring providing a supplemental down force together with a pneumatic lift cylinder to fine tune the total down force. In such a system, the spring would be set to provide a down force that is greater than what is needed at any time and the lift cylinder would be controlled to counter-act a portion of the spring down force to produce a desire net down force on the row unit. A sensor or pressure transducer 152 is located at the down force cylinder 144 to measure the force applied by the down force cylinder 144 on the row unit 28.

The row unit weight also produces a down force shown by the arrow FG acting through the center of gravity of the row unit. These two downward acting forces, FD and FG are counter-acted by upward forces acting on the row unit. The opener penetrates the soil and has a force FO acting upward on the opener. When the opener 124 is fully penetrating, the gauge wheels 128 will be in contact with the soil and a soil reaction force FR acts upward on the gauge wheels. An additional upward force on the row unit is the force FC acting on the closing wheels 142. Other attachments to the row unit, not shown, such as a coulter or row cleaner will also generate an upward force on the row unit. In systems with an up force cylinder 80, the supplemental down force FD, may at times be positive and at times negative, meaning it may be directed downward or upward, but is referred to herein as a "down force" regardless of direction.

A minimum soil reaction force FR acting on the gauge wheels 128 is desired to have confidence that the opener is fully penetrating the soil to the desired depth. If the soil reaction force FR acting on the gauge wheel is zero, the gauge wheel is not touching the soil. This only occurs when the opener is not fully penetrating the soil to the desired depth. Thus, some level of soil reaction force FR greater than zero is desired to be maintained to ensure there is full penetration by the opener. The magnitude of the force FR is measured by a sensor or load cell which can be placed in a variety of locations on the row unit. One example is a load sensor pin 146 in the gauge wheel depth adjustment link 148. Adjustment link 148 bears against and resists upward movement of the pivot arm 150 carrying the gauge wheels 128. A suitable load sensor pin is shown in US2010/0180695 A1 incorporated herein by reference. The load measured at the pin 146 is proportional to the soil reaction force FR, thus allowing the controller 202 to determine the soil reaction force at the gauge wheel 128 from the measured load. Load sensing pins may be provided at other points in the gauge wheel mounting and adjustment structure. Each row unit may be equipped with a gauge wheel load sensor pin 146 or only select row units may be so equipped. If only a few row units have gauge wheel load sensors, it is desired that there be at least one row unit on the frame main section and on a row unit on each frame wing section 24 with a gauge wheel load sensor.

The row units 26, 28 are representative of row crop planter row units for planting seed. The implement 10 may have other types of seed planting row units or may only be for applying fertilizer or chemicals. Each opener will need to have sufficient down force to ensure the opener is fully penetrating the soil.

When the bins 42, 44, 46 are full, the weight on the frame main section and thus the main wheel assemblies is greater than the weight on the wing wheel assemblies. The greater weight on the main wheel assemblies can lead to increased soil compaction in the tire tracks of the main wheel assemblies 30 compared to the soil compaction caused by the wing wheel assemblies 32 and certainly more compaction than there is between row units where there are no wheel assemblies. Depending on the soil type and conditions, this increased compaction can result in lower yield from the rows adjacent the main wheel assemblies. To alleviate the effects of soil compaction, the machine is equipped with a weight transfer system to transfer weight from the frame main section to the frame wing sections in a first mode of operation. This spreads the weight of the implement over all the wheel assemblies to achieve a greater balance of loads on the wheel assemblies. Equal load on all wheel assemblies is not necessarily the goal as the main wheel assemblies may be larger than the wing wheel assemblies and able to carry a greater total load while producing the same soil compaction. As such, the goal in the first mode of operation is to achieve more load balance across the machine than if there is no weight transfer to reduce soil compaction caused by the main wheel assemblies.

Figure 4:
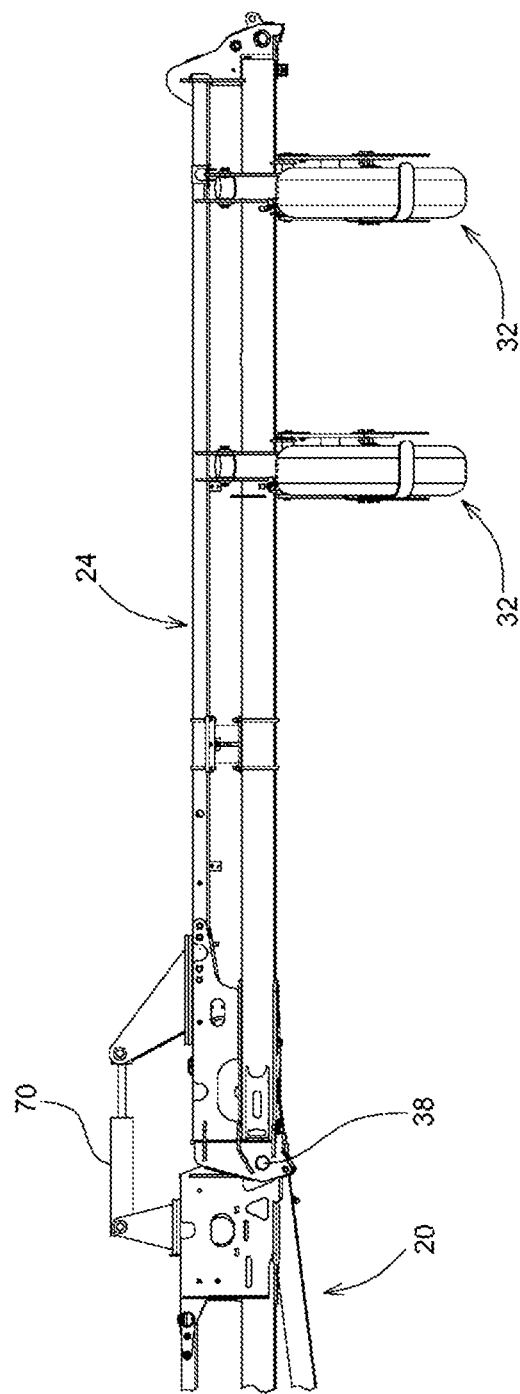
FIG. 4 is a front view of a portion of the tool bar of the implement of FIG. 1.

The weight transfer system includes a hydraulic cylinder 70 connected between the main frame section 20 and each wing section 22, 24 spanning across the wing pivot axes 36 and 38. The right cylinder 70 is shown in FIG. 4 spanning across the pivot axis 38. When the cylinder rod is extended, the cylinder 70 creates a clockwise moment about the axis 38 as viewed in FIG. 4. This creates a greater up-force, or soil reaction force, on the wing wheel assemblies 32 and a corresponding decrease on the up-force on the main wheel assemblies 30. The cylinder 70 could be mounted beneath the frame; in which case the rod is retracted to cause the weight transfer. Weight transfer of this type is known and is used on the John Deere 1720 stack-fold planter and the Kinze 3600 series and 4900 series planters. These planters, however, have no means to control the weight transfer to ensure that the loads are more balanced across the implement wheel assemblies. The amount of weight transfer is manually determined by operator input and remains at a set amount until changed by the operator.

To provide for greater load balance across the implement, the wheel assemblies can be provided with load cells to measure the load on the tires and wheels 50. The wheel assembly loads can be determined by a load cell at the axles 54, the pins 60 attaching the lift arms to the mounting brackets 56 or the pins 64 at either end of the cylinders 62. Suitable load sensing pins, bolts, etc. are available from Strainsert, Inc. of Conshohocken, Pa. The pressure in the wheel lift cylinders 62 can also be used to determine the load on the wheel assembly. A weight transfer control system operates the cylinders 70 to provide weight transfer to achieve greater balance of the soil reaction forces on the wheel assemblies. Only one wheel assembly on the frame main section and one wheel assembly on each frame wing section need to be equipped with a load cell to operate the cylinders 70 for weight transfer. However, all wheel assemblies can be so equipped if desired.

During operation of the machine, the product in the bins will gradually be applied to the soil or to plants, etc. and the weight on the main wheel assemblies will be reduced. The weight transfer control system will continually monitor the load on the wheel assemblies and adjust the amount of weigh transfer to maintain the improved load balance. The continuous monitoring of the wheel assembly loads enables feedback to the control system to make continuous adjustments in the magnitude of weight transfer.

The weight transfer can be controlled individually to the left and right wing sections to take into consideration weight differences between the two wings sections. For instance, if the machine is equipped with extendable row markers, the wing section with the row marker extended and in the ground will have a lower weight than the other wing section where the row marker is not extended.

Figure 5:
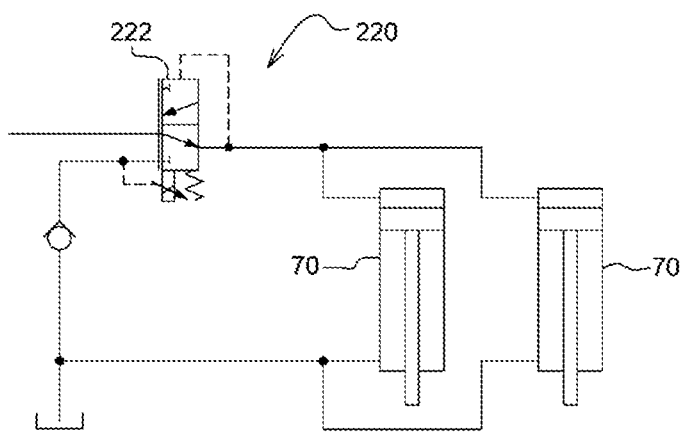
FIG. 5 is a hydraulic schematic for the weight transfer system on the implement of FIG. 1.

The hydraulic system 220 for the weight transfer is shown in FIG. 5. Valve 222 controls the flow of oil into and out of the cylinders 70. When the pressure in the cylinder reaches the desired level, the valve closes, trapping the oil in the cylinder and maintaining the down force on the wing section. The valve 222 is a proportional electronic reducing/relieving valve. The valve pressure is variable and set by a DC current input. This input is varied by the weight transfer control system to produce the desired pressure in the cylinders 70. As noted previously, the wing section is adapted to float on the ground. If the wing section travels over a low point, the pressure in the cylinder 70 will force the wing section downward to follow the ground, dropping the pressure in the cylinders 70, causing the valve 222 to open and supply more oil to the cylinders. If the wing section travels over a raised terrace, the pressure in the cylinder 70 will increase, causing the valve 222 to open and relieve pressure enabling the wing section to float upward. Alternatively, the hydraulic system can employ an accumulator with pressure to act as a spring allowing the wing section to float continuously. While a single valve 222 is used to control both the left and right wing weight transfer cylinders 70, separate valves 222 can be provided to separately control weight transfer to each wing section.

In place of actual measurement of the wheel assembly loading, other means can be used to approximate the wheel loading. For example, the bins 42, 44, 46 may be mounted on load cells to measure the weight of product in the bins. Suitable load cells are commercially available from Digi-Star Holdings, Inc. of Fort Atkinson, Wis. The weight transfer controller can determine the pressure needed in the cylinder 70 to transfer sufficient weight to substantially balance, or improve the balance of the loads on the wheel assemblies based on the machine geometry and the measured weight of product in the bins.

Bin level sensors can be used in place of bin load cells to determine the quantity of product in the bins. The product level and either actual density information input into the controller or an estimated density input can be used to determine the bin weight to use in calculating a cylinder pressure for weight transfer.

Heretofore, the weight transfer system has been described as using actual measured wheel loads or an approximation based on the weight of the product in the bins or an estimated weight of the product based on a bin level sensor. The weights or bin levels are continuous inputs to the control system for varying the weight transfer as the product is consumed. However, the weight transfer system could operate without any weight measurement or bin level measurement. When the operator fills the bins, he can input into the controller an estimate of the bin fill level. The product density can also be input to the controller. The density can be from typical density values for various products such as seed corn or bean seed, etc. or the product density can be measured by the operator and input into the controller. The controller can use this information to estimate the product weight and then calculate a desired pressure in the cylinder 70 to achieve an approximate balance across the wheel assemblies. By then using the seed sensor to count the seeds dispensed, the changing level of product in the bins can be continuously estimated. Other product dispensing sensors can be used to measure the rate of fertilizer or other chemical application. The calculated change in product in the bins can be used to continuously vary the amount of weight transfer to the frame wing sections.

In addition to balancing the load on the wheel assemblies across the machine, the weight transfer system can also be used to ensure the wing sections have sufficient weight for the row unit down force system in a second mode of operation. If the machine is working in hard soil, the static weight of the wing section may not be great enough for the pneumatic cylinders 144 to apply enough force FD to achieve the desire gauge wheel reaction force FR. In some instances, operators add iron weights to the frame wing sections to enable enough row unit down force. With the weight transfer system described above, weight can be transferred from the frame main section to the frame wing sections for row unit down force in a second mode of operation, even when weight transfer is not needed to reduce soil compaction in the first mode of operation. This can obviate the need to add iron weights to the wing sections.

The pressure transducer 152 is used to determine the need for weight transfer for row unit down force. The pressure transducer 152 measures the force FD that is transferred by the down force cylinder 144 from the frame wing section 24 onto the row unit 28. In other words, the applied force FD is the force that is removed from the frame wing section 24 to drive the row unit 28 toward or into the ground surface.

In previous publications, namely in U.S. Pat. No. 9,198,343, alternative systems are disclosed as being usable to determine the need for weight transfer for row unit down force. A first such system is the load sensor pin 146 in the gauge wheel depth adjustment link 148. The load measured at the pin 146 is proportional to the soil reaction force FR, allowing the controller 202 to determine the soil reaction force from the measured load. However, the load sensor pin 146 does not measure the force that is applied by the down force cylinder 144. Based on the location of the pin 146, the pin 146 can only measure the reaction force FR of the gauge wheels 128. The reaction force FR is only a component of the full force that opposes the applied force FD. Therefore, the force FO at the opening wheel 124 and the force FC at the closing wheel 142 can vary (e.g., due to soil conditions), yet these forces are not accounted for by the pin 148.

A height sensor or position sensor on the linkage 122 is also disclosed in U.S. Pat. No. 9,198,343 as being usable to determine the need for weight transfer for row unit downforce. If the height sensor detects that the frame wing section 24 is too high off the ground, or the position sensors on the linkage bottom out, this information can be relayed to the controller 202 by a signal, and weight can be transferred from the frame wing section 24 to the row unit 28. However, a height measurement determined by the height sensor does not account for the ground hardness and therefore is not representative of the applied force FD when one or more of the furrow opener 124, the gauge wheel 128, and the closing wheel 142 are in contact with the ground.

Figure 6:
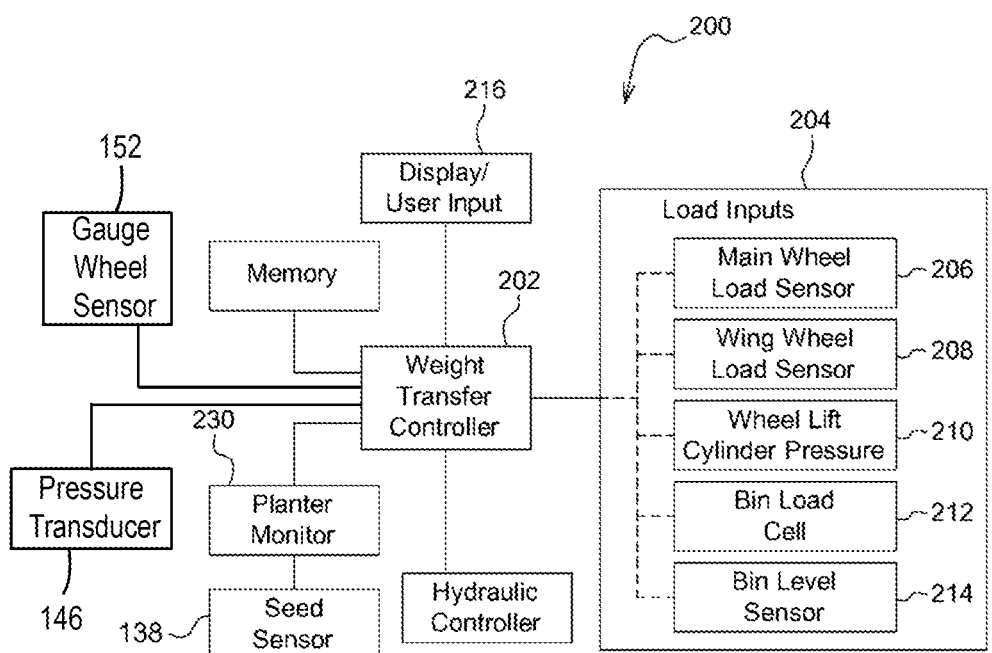
FIG. 6 is a schematic diagram of an example control system for the weight transfer system.

An example weight transfer control system 200 is shown in FIG. 6. The control system includes a controller 202 including a micro-processor programmed for the function of controlling the weight transfer system. The controller 202 receives one or more load inputs from the load input box 204. As mentioned before, the load inputs can include a main wheel assembly load sensor 206. The load sensor 206 can be a wheel axle 54 load cell, or load cell on any of the pins 60 or 64 as described above. A similar wing wheel assembly load sensor 208 can also be provided. The load on the wheels can also be determined by the internal pressure in the wheel lift cylinder with a sensor 210. The sensor 210 is likely a part of the hydraulic system. Other load sensors include the bin load cell 212 and the bin level sensor 214.

The control system 200 also includes a display/user input device 216 which may be a touch screen, to allow the operator to manually input a bin level estimate as well as input a nominal density value for the product. The controller also receives an input of product dispensing from the seed sensor 138 and other product dispensing sensors. The seed sensor input will likely be aggregated data from the planter monitor 230. The monitor also receives travel speed and/or position and time information from which product dispensing rates can be determined and a product dispense rate signal delivered to the weight transfer controller 202. The controller 202 uses these inputs to determine the amount of weight transfer and then sends a command to a hydraulic controller to operate the weight transfer cylinders 70. The physical architecture of the control system may vary from what is shown. For example, the controller 202 may be part of another system such as the planter monitor or the hydraulic controller, etc. Likewise, the display 216 may be used for other functions as well.

The control system 200 may also have an internal or external memory to record bin loads and the amount of weight transfer by location in the field. The location data is collected through a GPS or other positioning system now commonly used in precision agriculture. The data regarding bin loads and weight transfer can be used later and correlated with other field operations and subsequent yield data.

In the simplest form, for the first mode of operation, the weight transfer system uses operator provided information. When the operator fills a product into the bins, he then enters into the control system an estimate of how much product is in the bins, for example, to the nearest ⅛ of a bin. The operator also inputs the density of the product. The density can be from published tables for the particular product, or nominal values for the class of product. Alternatively, the operator can weigh a given volume of product, calculate the density and input that amount. The controller uses the estimate of bin fill and the density information to determine the product weight. This is added to the dead weight of the main section of the implement to determine the wheel load. With a known dead weight for the wings, the controller determines the amount of weight transfer needed to balance the implement load over all the wheel assemblies and the needed pressure in the weight transfer cylinders 70 to produce the desired weight transfer. As the implement is operated in the field, the controller uses dispense rate information from the seed sensors or other product sensors to determine how the product weight is changing. Other product dispensing systems may be programmed to apply product at a certain rate such as a certain number of gallons of chemical per acre. As the implement moves over the field, that information can be used to calculate a reduction in the quantity of chemical still in the bins or tanks. The controller uses the product dispensing information to continuously change the amount of weight transfer from the frame main section to the wings.

Greater precision is available with a measurement of the product in the bins. This can be done by a bin level sensor and user input data of the density. The bin level sensor can be used during operation to monitor the rate of consumption of the product and change the weight transfer accordingly. Still greater precision can be obtained by directly sensing the weight of the product in the bins or tanks with load cells on each bin and tank or by measuring the load on a main wheel assembly as described above. The change in this load over time is used to change the weight transfer. The greatest degree of precision is available from measuring the main wheel loads and the wing wheel loads. The weight transfer is then controlled to keep the desired loads on the main wheel assemblies and the wing wheel assemblies.

For the second mode of operation of the weight transfer system, to ensure that the row unit 28 on the frame wing section 24 is at a predetermined depth (e.g., the gauge wheel 128 is at a predetermined depth within the soil), the pressure transducer 152 measures the force FD applied by the row unit downforce system and generates a signal indicative of the applied force FD. The control system 200 operated the weight transfer system by actuating the hydraulic cylinder 70 in response to the signal from the pressure transducer 152 to assist the row unit downforce system. In other words, the row unit downforce system applies a downward force FD on the row unit 28 and the weight transfer system applied an additional secondary downward force FS on the row unit 28 via the frame wing section 24 to assist the applied force FD in driving the gauge wheel 128 and opening wheel 124 to and/or into the ground to the predetermined depths.

In order to determine the appropriate magnitude of the supplemental secondary force FS applied by the weight transfer system, the control system 200 also receives a signal from the gauge wheel sensor 146 that is indicative of the measured reaction force FR at the gauge wheel. The control system 200 compares the signals from the pressure transducer 152 and the gauge wheel sensor 146 to determine a force differential between the two forces FD, FR, respectively. The magnitude of the force differential is representative of a combined reaction force of the furrow opener 124 and the closing wheel 142 at the ground surface, offset from actual reaction force values by the weight FG of the row unit. The control system 200 determines the appropriate magnitude of the supplemental force FS applied by the weight transfer system based on the force differential. More specifically, when the force differential between the applied force FD and the reaction force FR is increased, the magnitude of the supplemental force FS is increased. When the force differential between the applied force FD and the reaction force FR is decreased, the magnitude of the supplemental force FS is decreased. At force differentials below a lower limit, the control system 200 determines that supplementary force FS is not necessary and the weight transfer system is not utilized to assist the row unit downforce system. The weight transfer system may still be operable in the first mode to limit compaction even if the force differential is below the lower threshold. Similarly, the weight transfer system may be operable in only the second mode, or in both modes simultaneously.

When the supplemental force FS is applied by the weight transfer system, the reaction force FR at the gauge wheel is at or above a predetermined threshold value to ensure that the furrow created by the furrow opener 124 and closed by the closing disk 142 is at an appropriate depth.

The implement may be operated in a manner that provides for a fixed portion of the total implement weight to be carried by the frame main section and the frame wing sections. For example, it may be desired that the frame main section carry 50% of the implement weight while each of the right and left frame wing sections carry 25% of the implement weight. After the main wheel assembly loads and the wing wheel assembly loads are determined, the weight transfer system transfers weight to the wings to achieve the desired weight distribution. During operation, the weight transfer is changed to maintain the desired weight distribution as the product in the product storage system on the frame main section is consumed.

The implement has been described in the context of a planter having a main frame section with laterally extending wing sections. The weight transfer system could also be adopted for use on an implement having a fore and aft arranged frame sections where only one frame section carries the load of the product storage system and it is desirable to transfer weight from one section to the other.

Having described the implement and its operation, it will become apparent that various modifications can be made without departing from the scope of the invention as defined in the accompanying claims.

What is claimed is:

1. An implement comprising:
 a frame having a main section and a wing section pivotally coupled to the main section;
 a main wheel assembly coupled to the frame main section to support the frame main section for movement over a ground surface;
 a wing wheel assembly coupled to the frame wing section to support the frame wing section for movement over the ground surface;
 a row unit mounted to the frame wing section to dispense a product to the ground surface;
 a weight transfer system coupled to the frame main and wing sections and adapted to transfer weight from the frame main section to the frame wing section to reduce the load carried by the main wheel assembly;
 a row unit downforce system coupled to the frame wing section and adapted to apply a force on the row unit relative to the frame wing section;
 a pressure transducer configured to measure the force applied by the row unit downforce system and generate a signal indicative of an insufficient applied force; and
 a control system adapted to operate the weight transfer system in response to the signal of insufficient applied force from the pressure transducer to assist the row unit downforce system, the control system programmed to actuate the weight transfer system to apply an additional force on the frame wing section in response to the signal.

2. The implement of claim 1, wherein the row unit includes a gauge wheel and a gauge wheel sensor configured to measure a reaction force at the gauge wheel from the ground surface and generate a signal indicative of the reaction force.

3. The implement of claim 2, wherein the control system is programmed to compare the signal indicative of the applied force and the signal indicative of the reaction force to determine a force differential.

4. The implement of claim 3, wherein the row unit further comprises a furrow opener configured to generate a furrow in the ground surface and a closing wheel configured to close the furrow in the ground surface, wherein the magnitude of the force differential is representative of a combined reaction force of the furrow opener and the closing wheel at the ground surface.

5. The implement of claim 3, wherein the magnitude of the additional force is dependent upon the force differential.

6. The implement of claim 2, wherein the control system is programmed to apply the additional force to generate a reaction force at the gauge wheel at or above a predetermined reaction force.

7. A method of operating an implement having a frame with a main section and a wing section pivotally coupled to the main section, the method comprising;
supporting the main section of the frame for movement over a ground surface with a main wheel;
supporting the wing section of the frame for movement over the ground surface with a wing wheel;
mounting a row unit to the wing section of the frame, the row unit including a furrow opener and a gauge wheel;
regulating the depth of the furrow which is cut into the soil by the furrow opener via the gauge wheel;
dispensing a product to the furrow via the row unit;
actuating a first hydraulic cylinder to apply a first force to the row unit from the wing section of the frame;
measuring the applied first force from the first hydraulic cylinder via a sensor;
comparing the applied first force to a reaction force at the gauge wheel via a control system; and
actuating a second hydraulic cylinder to apply a second force to the wing section relative to the main section based on the comparison of the applied first force and the reaction force.

8. The method of claim 7, wherein the row unit includes a gauge wheel and a gauge wheel sensor configured to measure a reaction force at the gauge wheel from the ground surface and generate a signal indicative of the reaction force.

9. The method of claim 8, wherein the control system is programmed to compare the signal indicative of the applied force and the signal indicative of the reaction force to determine a force differential.

10. The method of claim 9, wherein the row unit further comprises a furrow opener configured to generate a furrow in the ground surface and a closing wheel configured to close the furrow in the ground surface, wherein the magnitude of the force differential is representative of a combined reaction force of the furrow opener and the closing wheel at the ground surface.

11. The method of claim 9, wherein the magnitude of the second force is dependent upon the force differential.

12. The method of claim 7, wherein the control system is programmed to apply the second force to generate a reaction force at the gauge wheel at or above a predetermined reaction force.

13. The method of claim 7, wherein the sensor is a pressure transducer.

14. An implement comprising:
a frame having a main section and a wing section pivotally coupled to the main section;
a main wheel assembly coupled to the frame main section to support the frame main section for movement over a ground surface;
a wing wheel assembly coupled to the frame wing section to support the frame wing section for movement over the ground surface;
a row unit mounted to the frame wing section to dispense a product to the ground surface;
a product storage system mounted to the frame main section to carry the product;
a weight transfer system coupled to the frame main and wing sections and adapted to transfer weight from the frame main section to the frame wing section to reduce the load carried by the main wheel assembly;
a row unit downforce system coupled to the frame wing section and adapted to apply a force on the row unit relative to the frame wing section; and
a pressure transducer configured to measure the force applied by the row unit downforce system and generate a signal indicative of an insufficient applied force; and
a control system adapted to operate the weight transfer system in a first mode and a second mode;
wherein the control system is operable in the first mode to reduce the weight transferred from the frame main section to the frame wing section via the weight transfer system in response to a decrease in a quantity of product in the product storage system, and wherein the control system is operable in the second mode to increase the weight transferred from the frame main section to the frame wing section to assist the row unit downforce system via the weight transfer system in response to the signal of insufficient applied force from the pressure transducer.

15. The implement of claim 14, wherein the control system is adapted to operate the weight transfer system in the first mode simultaneous with the second mode.

16. The implement of claim 14, wherein the row unit includes a gauge wheel and a gauge wheel sensor configured to measure a reaction force at the gauge wheel from the ground surface and generate a signal indicative of the reaction force.

17. The implement of claim 16, wherein the control system is programmed to compare the signal indicative of the applied force and the signal indicative of the reaction force to determine a force differential.

18. The implement of claim 17, wherein the row unit further comprises a furrow opener configured to generate a furrow in the ground surface and a closing wheel configured to close the furrow in the ground surface, wherein the magnitude of the force differential is representative of a combined reaction force of the furrow opener and the closing wheel at the ground surface.

19. The implement of claim 17, wherein the magnitude of weight transferred from the frame main section to the frame wing section in the second mode is dependent upon the force differential.

20. The implement of claim 16, wherein, in the second mode, the control system is programmed to generate a reaction force at the gauge wheel at or above a predetermined reaction force.

* * * * *